US012750660B2

(12) United States Patent
Ihlar et al.

(10) Patent No.: US 12,750,660 B2
(45) Date of Patent: Sep. 29, 2026

(54) TECHNIQUE FOR ENABLING EXPOSURE OF INFORMATION RELATED TO ENCRYPTED COMMUNICATION

(71) Applicant: Telefonaktiebolaget LM Ericsson (publ), Stockholm (SE)

(72) Inventors: Marcus Ihlar, Älvsjö (SE); Zaheduzzaman Sarker, Järfälla (SE); Veronica Sanchez Vega, Madrid (ES); Miguel Angel Muñoz De La Torre Alonso, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 119 days.

(21) Appl. No.: 18/032,863

(22) PCT Filed: Feb. 2, 2021

(86) PCT No.: PCT/EP2021/052367
§ 371 (c)(1),
(2) Date: Apr. 20, 2023

(87) PCT Pub. No.: WO2022/083897
PCT Pub. Date: Apr. 28, 2022

(65) Prior Publication Data

US 2023/0388786 A1 Nov. 30, 2023

(30) Foreign Application Priority Data

Oct. 20, 2020 (EP) .................................... 20382915

(51) Int. Cl.
*H04L 29/06* (2006.01)
*H04W 12/037* (2021.01)

(52) U.S. Cl.
CPC ................................ *H04W 12/037* (2021.01)

(58) Field of Classification Search
CPC ... H04W 12/037; H04W 12/06; H04W 12/03; H04W 12/37; H04L 63/18; H04L 69/164;
(Continued)

(56) References Cited

U.S. PATENT DOCUMENTS

| | | | | |
|---|---|---|---|---|
| 9,900,313 | B2 * | 2/2018 | Wiest | H04L 63/0281 |
| 2017/0078922 | A1 * | 3/2017 | Raleigh | H04L 69/18 |
| 2020/0169584 | A1 * | 5/2020 | Penner | H04L 63/1466 |
| 2020/0260284 | A1 * | 8/2020 | Salkintzis | H04L 47/35 |
| 2021/0168665 | A1 * | 6/2021 | Salkintzis | H04W 12/02 |

(Continued)

FOREIGN PATENT DOCUMENTS

CN 111247821 A 6/2020

OTHER PUBLICATIONS

Aghaei-Foroushani et al., "A Proxy Identifier Based on Patterns in Traffic Flows", 2015 IEEE 16th International Symposium on High Assurance Systems Engineering, Date of Conference: Jan. 8-10, 2015.*

(Continued)

*Primary Examiner* — Morshed Mehedi
(74) *Attorney, Agent, or Firm* — Murphy, Bilak & Homiller, PLLC

(57) ABSTRACT

A technique for enabling exposure of information related to encrypted communication between a User Equipment, UE, and an application server in a mobile communication system is disclosed. A method implementation of the technique is performed by the UE and comprises establishing (S302) a communication channel with a network node of the mobile communication system, the communication channel being established as part of an application layer communication channel between the UE and the application server, wherein the network node acts as application layer proxy in the communication between the UE and the application server, and sending (S304) encrypted traffic through the communication channel to the network node for further delivery to the application server, wherein the communication channel is
(Continued)

used to exchange supplemental information related to the encrypted traffic between the UE and the network node.

29 Claims, 13 Drawing Sheets

(58) Field of Classification Search
CPC . H04L 63/0471; H04L 63/168; H04L 67/535; H04L 67/56; H04L 63/0281
See application file for complete search history.

(56) References Cited

OTHER PUBLICATIONS

2015.*
Nalawade et al., "Comparison of Present-day Transport Layer network Protocols and Google's QUIC," 2018 International Conference on Smart City and Emerging Technology (ICSCET), Mumbai, India, pp. 1-8 (Year: 2018).*
3GPP, "3GPP TR 23.787 V0.4.0", 3rd Generation Partnership Project; Technical Specification Group Services and System Aspects; Study on encrypted traffic detection and verification (Release 16), Jun. 2018, 1-46.
Motorola Mobility, et al., "Update of UE-Assisted Solution", SA WG2 Meeting #127, S2-184014, (revision of S2-183389), Sanya, P.R.China, Apr. 16-20, 2018, 1-12.
Qualcomm Incorporated, et al., "Alternative UE-assisted ENTRADE solution", 3GPP TSG-WG2 Meeting #127, S2-184519, (revision of S2-173570), Sanya, China, Apr. 16-20, 2018, 1-8.
2GPP, "3GPP TS 29.244 V15.50", 3rd Generation Partnership Project; Technical Specification Group Core Network and Terminals; Interface between the Control Plane and the User Plane Nodes; Stage 3 (Release 15).

* cited by examiner

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation / release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see subclause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see subclause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| **6/8** | **QUICU** | **Sxb, Sxc, N4** | **QUIC Proxy is supported by the UP function.** |
| Feature Octet / Bit: The octet and bit number within the Supported-Features IE, e.g. "5 / 1".<br>Feature: A short name that can be used to refer to the octet / bit and to the feature.<br>Interface: A list of applicable interfaces to the feature.<br>Description: A clear textual description of the feature. | | | |

Fig. 8

| Information elements | P | Condition / Comment | Appl. | | | | IE Type |
|---|---|---|---|---|---|---|---|
| | | | Sxa | Sxb | Sxc | N4 | |
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session.<br><br>Several IEs with the same IE type may be present to represent multiple PDRs.<br>See Table 7.5.2.2-1. | X | X | X | X | Create PDR |
| Create FAR | M | This IE shall be present for at least one FAR to be associated to the PFCP session.<br><br>Several IEs with the same IE type may be present to represent multiple FARs.<br>See Table 7.5.2.3-1. | X | X | X | X | Create FAR |
| Create URR | C | This IE shall be present if a measurement action shall be applied to packets matching one or more PDR(s) of this PFCP session.<br>Several IEs within the same IE type may be present to represent multiple URRs.<br>See Table 7.5.2.4-1. | X | X | X | X | Create URR |
| Create QER | C | This IE shall be present if a QoS enforcement or QoS marking action shall be applied to packets matching one or more PDR(s) of this PFCP session.<br>Several IEs within the same IE type may be present to represent multiple QERs.<br>See Table 7.5.2.5-1. | - | X | X | X | Create QER |
| Create BAR | O | When present, this IE shall contain the buffering instructions to be applied by the UP function to any FAR of this PFCP session set with the Apply Action requesting the packets to be buffered and with a BAR ID IE referring to this BAR. See table 7.5.2.6-1. | X | - | - | X | Create BAR |
| Create Traffic Endpoint | C | This IE may be present if the UP function has indicated support of PDI optimization.<br>Several IEs within the same IE type may be present to represent multiple Traffic Endpoints.<br>See Table 7.5.2.7-1. | X | X | X | X | Create Traffic Endpoint |
| PDN Type | C | This IE shall be present if the PFCP session is setup for an individual PDN connection or PDU session (see subclause 5.2.1).<br>When present, this IE shall indicate whether this is an IP or non-IP PDN connection/PDU session or, for 5GC, an Ethernet PDU session. | X | X | - | X | PDN Type |

Fig. 9a

| | | | | | | | |
|---|---|---|---|---|---|---|---|
| SGW-C FQ-CSID | C | This IE shall be included according to the requirements in clause 23 of 3GPP TS 23.007 [24]. | X | X | - | | FQ-CSID |
| MME FQ-CSID | C | This IE shall be included when received on the S11 interface or on S5/S8 interface according to the requirements in clause 23 of 3GPP TS 23.007 [24]. | X | X | - | - | FQ-CSID |
| PGW-C FQ-CSID | C | This IE shall be included according to the requirements in clause 23 of 3GPP TS 23.007 [24]. | X | X | - | - | FQ-CSID |
| ePDG FQ-CSID | C | This IE shall be included according to the requirements in clause 23 of 3GPP TS 23.007 [24]. | - | X | - | - | FQ-CSID |
| TWAN FQ-CSID | C | This IE shall be included according to the requirements in clause 23 of 3GPP TS 23.007 [24]. | - | X | - | - | FQ-CSID |
| User Plane Inactivity Timer | O | This IE may be present to request the UP function to send a User Plane Inactivity Report when no user plane packets are received for this PFCP session for a duration exceeding the User Plane Inactivity Timer.<br>When present, it shall contain the duration of the inactivity period after which a User Plane Inactivity Report shall be generated. | - | X | X | X | User Plane Inactivity Timer |
| User ID | O | This IE may be present, based on operator policy. It shall only be sent if the UP function is in a trusted environment.<br>See NOTE. | X | X | X | X | User ID |
| Trace Information | O | When present, this IE shall contain the trace instructions to be applied by the UP function for this PFCP session. | X | X | X | X | Trace Information |
| **QUIC Proxy** | **O** | **When present, this IE shall contain the QUIC Proxy instructions to be applied by the UP function for this PFCP session.** | - | **X** | **X** | **X** | **QUIC Proxy** |
| NOTE: This can be used for troubleshooting problems in the UP function affecting a subscriber. | | | | | | | |

Fig. 9b

| Information elements | P | Condition / Comment | Appl. | | | | IE Type |
|---|---|---|---|---|---|---|---|
| | | | Sx a | Sx b | Sx c | N4 | |
| Node ID | M | This IE shall contain the unique identifier of the sending Node. | X | X | X | X | Node ID |
| Cause | M | This IE shall indicate the acceptance or the rejection of the corresponding request message. | X | X | X | X | Cause |
| Offending IE | C | This IE shall be included if the rejection is due to a conditional or mandatory IE missing or faulty. | X | X | X | X | Offending IE |
| UP F-SEID | C | This IE shall be present if the cause is set to "Request accepted (success)". When present, it shall contain the unique identifier allocated by the UP function identifing the session. | X | X | X | X | F-SEID |
| Created PDR | C | This IE shall be present if the cause is set to "success" and the UP function was requested to allocate the local F-TEID for the PDR. When present, this IE shall contain the PDR information associated to the PFCP session. There may be several instances of this IE. See table 7.5.3.2-1. | X | X | - | X | Created PDR |
| Load Control Information | O | The UP function may include this IE if it supports the load control feature and the feature is activated in the network. See Table 7.5.3.3-1. | X | X | X | X | Load Control Information |
| Overload Control Information | O | During an overload condition, the UP function may include this IE if it supports the overload control feature and the feature is activated in the network. See Table 7.5.3.4-1. | X | X | X | X | Overload Control Information |
| SGW-U FQ-CSID | C | This IE shall be included according to the requirements in clause 23 of 3GPP TS 23.007 [24]. | X | - | - | - | FQ-CSID |
| PGW-U FQ-CSID | C | This IE shall be included according to the requirements in clause 23 of 3GPP TS 23.007 [24]. | - | X | - | - | FQ-CSID |
| Failed Rule ID | C | This IE shall be included if the Cause IE indicates a rejection due to a rule creation or modification failure. | X | X | X | X | Failed Rule ID |
| Created Traffic Endpoint | C | This IE shall be present if the cause is set to "success" and the UP function was requested to allocate a local F-TEID in a Create Traffic Endpoint IE. When present, it shall contain the local F-TEID to be used for this Traffic Endpoint. There may be several instances of this IE. | X | X | - | X | Created Traffic Endpoint |
| **QUIC Proxy IP Address** | **C** | **This IE shall be present if the cause is set to "success" and the UP function was requested to activate the QUIC Proxy functionality. When present, it shall contain the QUIC Proxy IP address.** | - | **X** | **X** | **X** | **QUIC Proxy IP Address** |

Fig. 10

TECHNIQUE FOR ENABLING EXPOSURE OF INFORMATION RELATED TO ENCRYPTED COMMUNICATION

TECHNICAL FIELD

The present disclosure generally relates to mobile communication systems. In particular, a technique for enabling exposure of information related to encrypted communication between a User Equipment (UE) and an application server in a mobile communication system is presented. The technique may be embodied in methods, computer programs, apparatuses and systems.

BACKGROUND

Modern mobile communication systems, such as mobile communication systems of the fourth generation (4G) or the fifth generation (5G) are based on the Control and User Plane Separation (CUPS) architecture in which user plane and control plane nodes are separated from each other, wherein the user plane is generally dedicated to carrying user traffic while the control plane is dedicated to carrying control signaling in the network.

FIG. 1 illustrates an exemplary architecture of a 5G network where the user plane carries traffic exchanged between application servers running in a Data Network (DN) and a UE, wherein next generation NodeBs (gNBs) operating as base stations of a Radio Access Network (RAN) as well as a User Plane Function (UPF) operating as a gateway node of the network represent user plane nodes. The other nodes shown in FIG. 1, on the other hand, represent control plane nodes of the network, including an Access and Mobility Management Function (AMF) responsible for e.g. authentication, authorization and mobility management, a Session Management Function (SMF) responsible for e.g. session management and the selection and control of the UPF, an Authentication Server Function (AUSF) storing authentication data of UEs, a Network Slice Selection Function (NSSF) responsible for network slice selection, a Network Exposure Function (NEF) exposing services and capabilities of the Network Functions (NFs) of the 5G network, an NF Repository Function (NRF) providing support for NF service discovery functions, a Policy Control Function (PCF) responsible for policy control to support Quality of Service (QoS) management, a Unified Data Repository (UDR) usable e.g. by the PCF to store policy related data, and an Application Function (AF) providing information on packet flows to the PCF, for example.

The PCF generally supports a unified policy framework to govern the network behavior and, more specifically, provides Policy and Charging Control (PCC) rules to a Policy and Charging Enforcement Function (PCEF), such as the SMF/UPF which may together enforce policy and charging decisions according to the provisioned PCC rules. The SMF thus receives PCC rules from the PCF and configures the UPF accordingly. The UPF supports handling user plane traffic based on rules received from the SMF and applying different enforcement actions accordingly (e.g., with respect to QoS, Charging, etc.). To this end, the UPF supports Deep Packet Inspection (DPI) functionality to monitor the traffic exchanged between an application server of the DN and the UE.

By the NEF, the network supports an exposure framework which allows exposing services and information between content providers and network operators of the mobile communication system, wherein the content providers provide the application servers in the DN as well as corresponding application clients for execution on the UEs (e.g., YouTube application servers and corresponding YouTube apps installed on UEs). The NEF may include a Packet Flow Description Function (PFDF) which handles Packet Flow Descriptions (PFDs) associated with application identifiers and transfers them to the SMF which, in turn, sends the PFDs towards the UPF, enabling the UPF to perform accurate packet flow based application detection when performing DPI. The Nnef interface between the NEF and an application server allows the application server to access the services and capabilities of the NFs exposed by the NEF. As a mere example, the exposure framework may be used to help the network operator to classify a user's application data traffic, which may be done through the Nnef Northbound PFD Management Application Programming Interface (API), via which content providers may send the application's data traffic classification rules to be applied (e.g., in the form of PFDs) to the network operator.

Nowadays, there is a general trend to increasing use of traffic encryption. With this trend, it will become more and more difficult to correlate exposure information with a corresponding user's data traffic. This will apply to applications that communicate using the Quick User Datagram Protocol (UDP) Internet Connections (QUIC) protocol, for example. QUIC is a UDP based stream-multiplexed and secure transport protocol supporting integrity protected headers and encrypted payload. QUIC may be a potential candidate to become the main transport protocol in the user plane of mobile communication systems in the future, and many applications that today run mainly over the Hypertext Transfer Protocol (HTTP) or the Hypertext Transfer Protocol Secure (HTTPS) may be expected to migrate to QUIC. Encryption prevents the current exposure mechanism from detecting and classifying traffic, however, and use cases, such as the above-mentioned classification of a user's application data traffic, may no longer be possible with the encrypted traffic. It will be understood that the same problem not only applies to communication using the QUIC protocol, but may also occur with other encryption techniques, such as HTTPS, encrypted Transport Layer Security (TLS) headers like Server Name Indication (SNI), Domain Name System (DNS) over HTTPS (DoH), or the like.

SUMMARY

Accordingly, there is a need for a technique that allows both network operators and content providers to support an exposure mechanism even though application traffic is encrypted.

According to a first aspect, a method for enabling exposure of information related to encrypted communication between a UE and an application server in a mobile communication system is provided. The method is performed by the UE and comprises establishing a communication channel with a network node of the mobile communication system, the communication channel being established as part of an application layer communication channel between the UE and the application server, wherein the network node acts as application layer proxy in the communication between the UE and the application server, and sending encrypted traffic through the communication channel to the network node for further delivery to the application server, wherein the communication channel is used to exchange supplemental information related to the encrypted traffic between the UE and the network node.

The supplemental information may comprise an application identifier communicated from the UE to the network node, the application identifier indicating an application which originates the encrypted traffic on the UE. The application identifier may be to be used by the network node to classify the encrypted traffic, optionally for an enforcement of policy rules defined for the communication between the UE and the application server. The encrypted traffic may be communicated as part of one of a plurality of application sessions, wherein encrypted traffic of each of the plurality of application sessions may be sent through the communication channel, wherein the encrypted traffic of each of the plurality of application sessions may be sent over a same data session established by the mobile communication system for the UE.

The encrypted traffic may correspond to QUIC protocol based traffic exchanged between the UE and the application server. The supplemental information may comprise information indicating one or more QUIC connections which are associated with the application identifier. The application identifier may be communicated from the UE to the network node together with the encrypted traffic, wherein the application identifier may be to be removed by the network node prior to delivery of the encrypted traffic to the application server. The communication channel may be at least one of an encrypted communication channel and an authenticated communication channel.

The method may further comprise receiving a network address indicative of the network node acting as application layer proxy, wherein establishing the communication channel with the network node may be performed using the network address. The network address may be provided by a control plane node of the mobile communication system, optionally as part of a data session establishment procedure carried out in the mobile communication system for the UE. Also, the network address may be obtained from a DNS service. A Fully Qualified Domain Name (FQDN) of the network node acting as application layer proxy may be pre-provisioned as part of a Service Level Agreement (SLA).

According to a second aspect, a method for enabling exposure of information related to encrypted communication between a UE and an application server in a mobile communication system is provided. The method is performed by a network node of the mobile communication system and comprises establishing, upon request of the UE, a communication channel with the UE, the communication channel being established as part of an application layer communication channel between the UE and the application server, wherein the network node acts as application layer proxy in the communication between the UE and the application server, and receiving encrypted traffic through the communication channel from the UE for further delivery to the application server, wherein the communication channel is used to exchange supplemental information related to the encrypted traffic between the UE and the network node.

The method according to the second aspect may define a method from the perspective of a network node described above in relation to the method according to the first aspect. As in the method of the first aspect, the supplemental information may comprise an application identifier communicated from the UE to the network node, the application identifier indicating an application which originates the encrypted traffic on the UE. The application identifier may be used by the network node to classify the encrypted traffic, optionally for an enforcement of policy rules defined for the communication between the UE and the application server. The encrypted traffic may be communicated as part of one of a plurality of application sessions, wherein encrypted traffic of each of the plurality of application sessions may be sent through the communication channel, wherein the encrypted traffic of each of the plurality of application sessions may be sent over a same data session established by the mobile communication system for the UE.

The encrypted traffic may correspond to QUIC protocol based traffic exchanged between the UE and the application server. The supplemental information may comprise information indicating one or more QUIC connections which are associated with the application identifier. The application identifier may be communicated from the UE to the network node together with the encrypted traffic, wherein the application identifier may be removed by the network node prior to delivery of the encrypted traffic to the application server. The communication channel may be at least one of an encrypted communication channel and an authenticated communication channel.

The method may further comprise sending, prior to establishing the communication channel, a capability indication to a control plane node of the mobile communication system for use in selecting a network node acting as application layer proxy for the communication between the UE and the application server, the capability indication indicating that the network node supports acting as application layer proxy. The method may further comprise receiving, prior to establishing the communication channel, an instruction to act as application layer proxy from a control plane node of the mobile communication system, and activate acting as application layer proxy in accordance with the instruction. The method may further comprise providing, prior to establishing the communication channel, a network address indicative of the network node acting as application layer proxy to a control plane node of the mobile communication network. At least one of sending the capability indication, receiving the instruction to act as application layer proxy and providing the network address may be performed as part of a data session establishment procedure carried out in the mobile communication system for the UE.

According to a third aspect, a method for enabling exposure of information related to encrypted communication between a UE and an application server in a mobile communication system is provided. The mobile communication system comprises a network node configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node. The method is performed by a first control plane node of the mobile communication system and comprises receiving a capability indication from the network node for use in selecting a network node acting as application layer proxy for the communication between the UE and the application server, the capability indication indicating that the network node supports acting as application layer proxy.

The method according to the third aspect may define a method from the perspective of a control plane node described above in relation to the at least one of the methods according to the first and the second aspect. The first control plane node may be a control plane node responsible for network node selection, wherein the method may further comprise receiving, optionally from a second control plane node, an indication of a requirement that a network node handling the communication between the UE and the application server is to support acting as application layer proxy, selecting the network node for the communication between the UE and the application server based on the capability indication, and instructing the network node to act as application layer proxy. The method may further comprise receiving, from the network node, a network address indicative of the network node acting as application layer proxy, and providing the network address to the UE, optionally via one or more other control plane nodes of the mobile communication system. At least one of receiving the indication of the requirement and providing the network address may be performed as part of a data session establishment procedure carried out in the mobile communication system for the UE.

According to a fourth aspect, a method for enabling exposure of information related to encrypted communication between a UE and an application server in a mobile communication system is provided. The mobile communication system comprises a network node configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node. The method is performed by a second control plane node of the mobile communication system and comprises providing, optionally to a first control plane node, an indication of a requirement that a network node handling the communication between the UE and the application server is to support acting as application layer proxy.

The method according to the fourth aspect may define a method from the perspective of a control plane node described above in relation to the at least one of the methods according to the first and the second aspect. The second control plane node may be a control plane node responsible for policy control, wherein the indication of the requirement may be provided to the first control plane node in the form of a policy rule. The requirement may be obtained from a data repository of the mobile communication system storing subscriber data, wherein the requirement may be obtained from the data repository in the form of subscriber policy data. The requirement may be originally set by the application server and communicated to the mobile communication system via an exposure interface of the mobile communication system. Providing the indication of the requirement may be performed as part of a data session establishment procedure carried out in the mobile communication system for the UE.

According to a fifth aspect, a computer program product is provided. The computer program product comprises program code portions for performing the method of at least one of the first, second, third and fourth aspect when the computer program product is executed on one or more computing devices (e.g., a processor or a distributed set of processors). The computer program product may be stored on a computer readable recording medium, such as a semiconductor memory, DVD, CD-ROM, and so on.

According to a sixth aspect, a UE for enabling exposure of information related to encrypted communication between the UE and an application server in a mobile communication system is provided. The UE comprises at least one processor and at least one memory, wherein the at least one memory contains instructions executable by the at least one processor such that the UE is operable to perform any of the method steps presented herein with respect to the first aspect.

According to a seventh aspect, a computing unit configured to execute a network node of a mobile communication system for enabling exposure of information related to encrypted communication between a UE and an application server in the mobile communication system is provided. The computing unit comprises at least one processor and at least one memory, wherein the at least one memory contains instructions executable by the at least one processor such that the network node is to operable to perform any of the method steps presented herein with respect to the second aspect.

According to an eighth aspect, a computing unit configured to execute a first control plane node of a mobile communication system for enabling exposure of information related to encrypted communication between a UE and an application server in a mobile communication system is provided. The computing unit comprises at least one processor and at least one memory, wherein the at least one memory contains instructions executable by the at least one processor such that the first control plane node is operable to perform any of the method steps presented herein with respect to the third aspect.

According to a ninth aspect, a computing unit configured to execute a second control plane node of a mobile communication system for enabling exposure of information related to encrypted communication between a UE and an application server in a mobile communication system is provided. The computing unit comprises at least one processor and at least one memory, wherein the at least one memory contains instructions executable by the at least one processor such that the second control plane node is operable to perform any of the method steps presented herein with respect to the fourth aspect.

According to a tenth aspect, there is provided a system comprising a UE according to the sixth aspect, a computing unit according to the seventh aspect, optionally a computing unit according to the eighth aspect, and further optionally a computing unit according to the ninth aspect.

BRIEF DESCRIPTION OF THE DRAWINGS

Implementations of the technique presented herein are described herein below with reference to the accompanying drawings, in which.

FIGS. *7a* to *7c* illustrate a signaling diagram of an exemplary interaction between entities of a mobile communication system according to the present disclosure;

FIG. 8 illustrates an exemplary extension to an existing UPF capabilities reporting where support of acting as QUIC proxy by a UPF is indicated;

FIGS. 9*a* and 9*b* illustrate an exemplary extension of the PFCP protocol where a QUIC proxy instruction to be applied by a UPF is indicated; and FIG. 10 illustrates an exemplary extension of the PFCP protocol where success of activating a UPF as QUIC proxy and a corresponding QUIC proxy IP address are indicated.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2A:
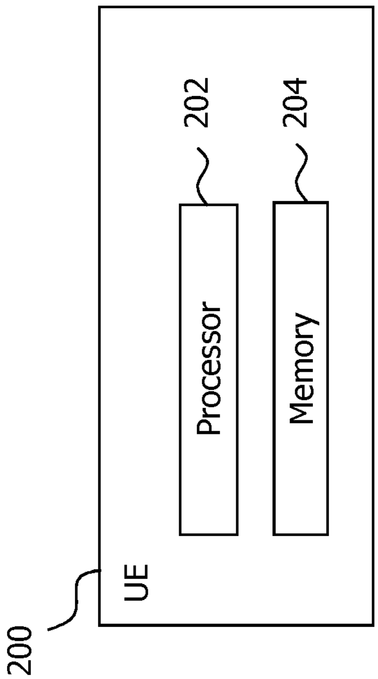
FIGS. 2*a* to 2*d* illustrate exemplary compositions of a UE, a computing unit configured to execute a network node, a computing unit configured to execute a first control plane node, and a computing unit configured to execute a second control plane node of a mobile communication system according to the present disclosure.

FIG. 2*a* schematically illustrates an exemplary composition of a UE 200 for enabling exposure of information related to encrypted communication between the UE 200 and an application server in a mobile communication system. The UE 200 comprises at least one processor 202 and at least one memory 204, wherein the at least one memory 204 contains instructions executable by the at least one processor 202 such that the UE 200 is operable to carry out the method steps described herein below with reference to the "UE".

Figure 2C:
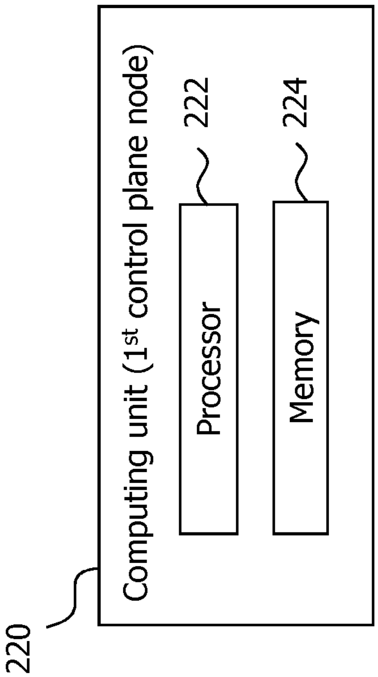
Figure 2B:
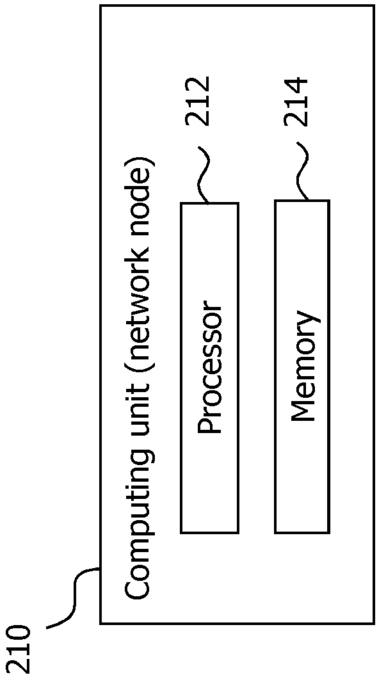

FIG. 2*b* schematically illustrates an exemplary composition of a computing unit 210 configured to execute a network node of a mobile communication system for enabling exposure of information related to encrypted communication between a UE and an application server in the mobile communication system. The computing unit 210 comprises at least one processor 212 and at least one memory 214, wherein the at least one memory 214 contains instructions executable by the at least one processor 212 such that the network node is operable to carry out the method steps described herein below with reference to the "network node".

FIG. 2*c* schematically illustrates an exemplary composition of a computing unit 220 configured to execute a first control plane node of a mobile communication system for enabling exposure of information related to encrypted communication between a UE and an application server in a mobile communication system. The computing unit 220 comprises at least one processor 222 and at least one memory 224, wherein the at least one memory 224 contains instructions executable by the at least one processor 222 such that the first control plane node is operable to carry out the method steps described herein below with reference to the "first control plane node".

Figure 2D:
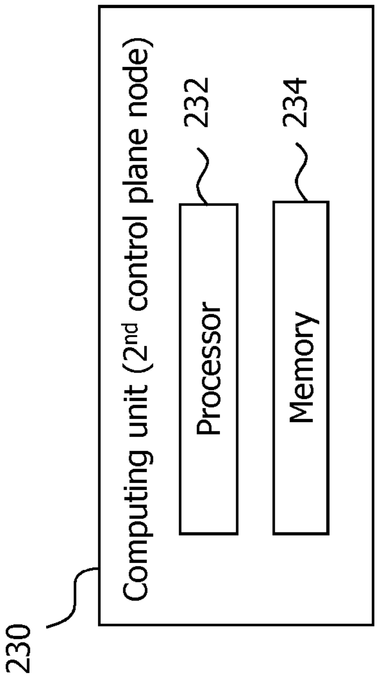

FIG. 2*d* schematically illustrates an exemplary composition of a computing unit 230 configured to execute a second control plane node of a mobile communication system for enabling exposure of information related to encrypted communication between a UE and an application server in a mobile communication system. The computing unit 230 comprises at least one processor 232 and at least one memory 234, wherein the at least one memory 234 contains instructions executable by the at least one processor 232 such that the second control plane node is operable to carry out the method steps described herein below with reference to the "second control plane node".

It will be understood that each of the the computing unit 210, the computing unit 220 and the computing unit 230 may be implemented on a physical computing unit or a virtualized computing unit, such as a virtual machine, for example. It will further be appreciated that each of the computing unit 210, the computing unit 220 and the computing unit 230 may not necessarily be implemented on a standalone computing unit, but may be implemented as components—realized in software and/or hardware—residing on multiple distributed computing units as well, such as in a cloud computing environment, for example.

Figure 3:
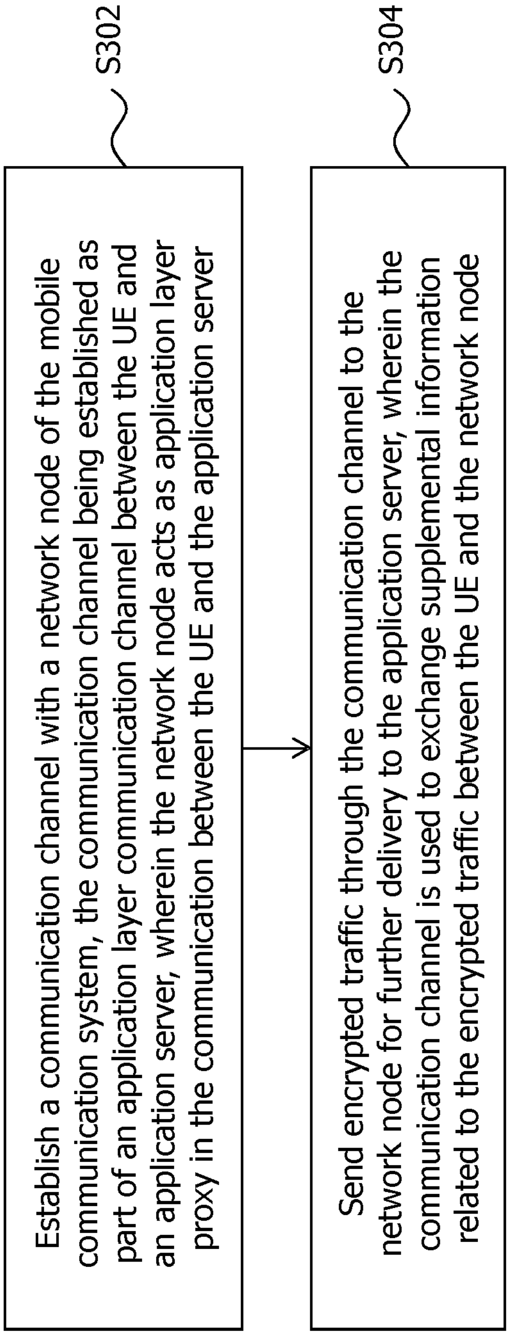
FIG. 3 illustrates a method which may be performed by the UE according to the present disclosure.

FIG. 3 illustrates a method which may be performed by the UE 200. The method is dedicated to enabling exposure of information related to encrypted communication between a UE (e.g., the UE 200) and an application server in a mobile communication system. In step S302, the UE may establish a communication channel with a network node (e.g., the network node executed on the computing unit 210) of the mobile communication system, the communication channel being established as part of an application layer communication channel between the UE and the application server, wherein the network node acts as application layer proxy in the communication between the UE and the application server. In step S304, the UE may send encrypted traffic through the communication channel to the network node for further delivery to the application server, wherein the communication channel is used to exchange supplemental information related to the encrypted traffic between the UE and the network node.

By establishing the communication channel as part of an application layer communication channel between the UE and the application server and using the network node as an application layer proxy in the communication between the UE and the application server, the network node may form an intermediate endpoint in the communication between the UE and the application server. The application layer communication channel between the UE and the application server may thus be split into portions, wherein the communication channel established between the UE and the network node may form a first portion of the overall application layer communication channel, having the UE and the network node as endpoints, and wherein another communication channel established between the network node and the application server may form a second portion of the overall application layer communication channel, having the network node and the application server as endpoints. As will be appreciated by one of skill in the art, the application layer may be a layer above the transport layer and the network layer of the communication protocol stack. The communication channel may be established using an application client running on the UE that is about to communicate with the application server.

The network node may function as a proxy, i.e., as an intermediary entity which passes on requests and responses between a client and a server (i.e., the UE/application client and the application server in the present case) and which may optionally modify the requests or responses to provide some added service (typical services of common proxies, not necessarily relevant for the technique presented herein, may include media type transformation, protocol reduction, anonymity filtering, or the like). The latter proxy type is usually called a "non-transparent proxy", as compared to a so called "transparent proxy" which normally does not modify the requests or responses beyond what is required for proxy authentication and identification.

Being an intermediate endpoint in the communication between the UE and the application server, the network node may decrypt the encrypted traffic received from the UE before the traffic is forwarded to the application server as the final destination (it will be understood that the same may apply in the other communication direction, of course). The network node may thus have access to the clear text of the encrypted traffic and may use the clear text (e.g., upon performing packet inspection) to expose (or "provide") information related to the encrypted traffic to the network operator of the mobile communication system (or, more generally, to the network). The communication channel established between the UE and the network node may thus be used to exchange supplemental information (i.e., information to be exposed) related to the encrypted traffic between the UE and the network node. The supplemental information may be information which is to be provided from the content provider to the network operator, or may be information which is to be provided from the network operator to the content provider, for example. Providing information to the network operator (or, more generally, to the network) may involve providing the information to another network entity of the mobile communication system. Providing information to the content provider may involve providing the information to the application server provided by the content provider, or to the application client provided by the content provider running on the UE. As a mere example, the application server may be a YouTube application server and the application client may be a YouTube app installed on the UE, YouTube being the content provider.

In one variant, in which the supplemental information is to be provided from the content provider to the network operator, the supplemental information may comprise an application identifier communicated from the UE to the network node, wherein the application identifier indicates an application which originates the encrypted traffic on the UE. In this case, the application identifier may be provided by the content provider (again, it is the content provider which provides the application running on the UE, such as the YouTube app) and may be communicated as supplemental information related to the encrypted traffic through the communication channel to the network node, thereby enabling the network node to expose the application identifier as provided from the content provider to the network operator (or, more generally, to the network) and allowing the network operator to classify application traffic, even when the traffic is encrypted. The application identifier may as such be used by the network node to classify the encrypted traffic, optionally for an enforcement of policy rules defined for the communication between the UE and the application server.

In another variant, in which the supplemental information is to be provided from the network operator to the content provider, the supplemental information may comprise information determined by the network operator (or, more generally, by the network), such as a user's remaining quota. The thus determined information may be communicated from the network node to the UE (or, more specifically, to the application client, such as the YouTube app running on the UE), thereby informing the content provider of the determined information and enabling the UE to inform the user of the application client of his remaining quota, for example. It will be understood that this is merely an exemplary use case and that the proposed technique can be used in a similar manner to generically exchange information related to encrypted traffic between the content provider and the network operator, thereby allowing both the network operator and the content provider to support an exposure mechanism, even though application traffic is generally encrypted.

Figure 1:
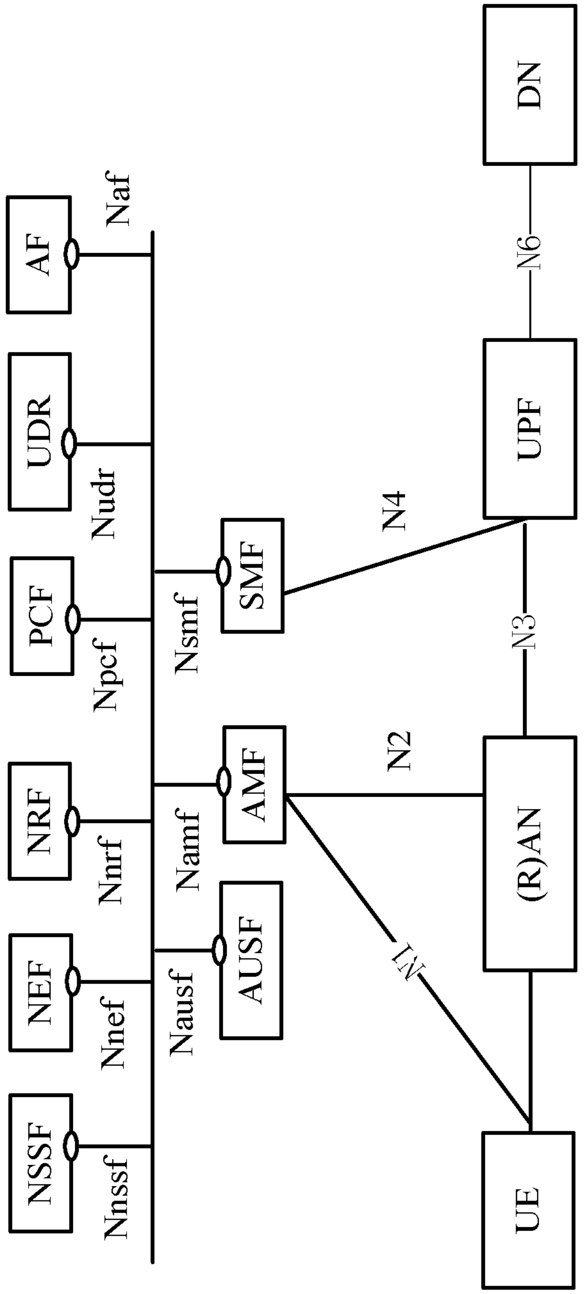
FIG. 1 illustrates an overview of a general 3GPP reference architecture of 5G systems.

The mobile communication system may be a 4G network or a 5G network, for example, but it will be understood that the principles of the technique presented herein may likewise be employed with other types of mobile communication systems. The application server may be provided in a DN connected to the mobile communication system, as explained above with reference to FIG. 1. The network node may be any network node of the mobile communication system and, in particular, a network node of the Core Network (CN) of the mobile communication system. In one variant, the network node may be a gateway node of the mobile communication system, such as a UPF of a 5G network or a Packet Data Network (PDN) Gateway User plane function (PGW-U) or Traffic Detection Function User plane function (TDF-U) of a 4G network, for example. In this case, the gateway node may apply packet inspection (e.g., DPI) techniques to extract the supplemental information to be exposed from the (clear text of the) encrypted traffic before the traffic is forwarded to the application server, as described above. It will be understood, however, that other types of network nodes acting as application layer proxy according to the technique presented herein may be employed as well, such as an external Service Function (SF) in a service chaining architecture or an AF of the mobile communication system, for example.

In practice, once the mobile communication system has established a data session for the UE, such as a Protocol Data Unit (PDU) session in case of a 5G network (the data session corresponding to a logical connection set up by the mobile communication network between the UE and the application server), the network node acting as the application layer proxy may be used to handle multiple application sessions over the same data session. The encrypted traffic may thus be communicated as part of a plurality of application sessions, wherein traffic of each of the plurality of application sessions may be sent through the communication channel, wherein the encrypted traffic of each of the plurality of application sessions may be sent over the same data session established by the mobile communication system for the UE. In one variant, the encrypted traffic may correspond to QUIC protocol based traffic exchanged between the UE and the application server, in which case the network node may handle any application sessions using QUIC as transport protocol during the user's established data session (e.g., PDU session). The application layer proxy may in this case be a QUIC proxy, i.e., a proxy that receives encrypted traffic from the UE and forwards it to the application server using the QUIC protocol. It may also be based on any similar protocol, or any protocol that builds on QUIC like MASQUE (Multiplexed Application Substrate over QUIC Encryption) as currently developed by IETF. If the supplemental information comprises an application identifier communicated from the UE to the network node, as described above, the supplemental information may further comprise information indicating one or more QUIC connections which are associated with the application identifier. In this way, the communication channel may also be used to exchange information about which QUIC connections the application identifier is associated with, for example.

While it will be understood that the application identifier may be communicated through the communication channel from the UE to the network node separately from the encrypted traffic, in one variant, the application identifier may be sent along with the encrypted traffic. In this case, the network node may remove the application identifier from the traffic before passing on the traffic to the application server. The network node may in this case act as a "non-transparent" application layer proxy providing additional services beyond the mere forwarding of traffic to the application server. The application identifier may be removable from the encrypted traffic because the identifier may not be needed on the further way to the application server after it has been processed (exposed) by the network node. The application identifier may thus be communicated from the UE to the network node together with the encrypted traffic, wherein the application identifier may be to be removed by the network node prior to delivery of the encrypted traffic to the application server. For secure exposure between the network operator and the content provider, encryption and/or authentication may be employed, such as by the use of the QUIC protocol, for example. The communication channel may thus be at least one of an encrypted communication channel and an authenticated communication channel.

In order to be able to establish the communication channel with the network node on application level (i.e., between the application client running on the UE and the network node acting as application layer proxy), the network node may need to know the network address (e.g., the Internet Protocol (IP) address) of the network node.

The UE may thus be informed about the network address needed to reach the network node and, therefore, the method performed by the UE may further comprise receiving a network address indicative of the network node acting as application layer proxy, wherein establishing the communication channel with the network node may be performed using the network address.

To inform the UE of the network address, various discovery mechanisms may be conceivable. In one variant, the network address may be provided to the UE by a control plane node of the mobile communication system, optionally as part of a data session establishment procedure carried out in the mobile communication system for the UE. In a 5G network, such data session establishment procedure may correspond to a PDU session establishment procedure, as part of which the network address may be provided to the UE, for example. The network node may thus receive the network address from the control plane node via Non-Access Stratum (NAS) signaling. For example, the network address may be received from an SMF, optionally via an AMF, of a 5G network. In order to avoid impacting the UE modem through NAS signaling, other discovery mechanisms may operate at the UE application layer, such as DNS based discovery or by an FQDN pre-provisioned to the UE as part of an SLA agreement. In one such variant, the network address may thus be obtained from a DNS service. Also, an FQDN of the network node acting as application layer proxy may be pre-provisioned as part of an SLA, for example.

Figure 4:
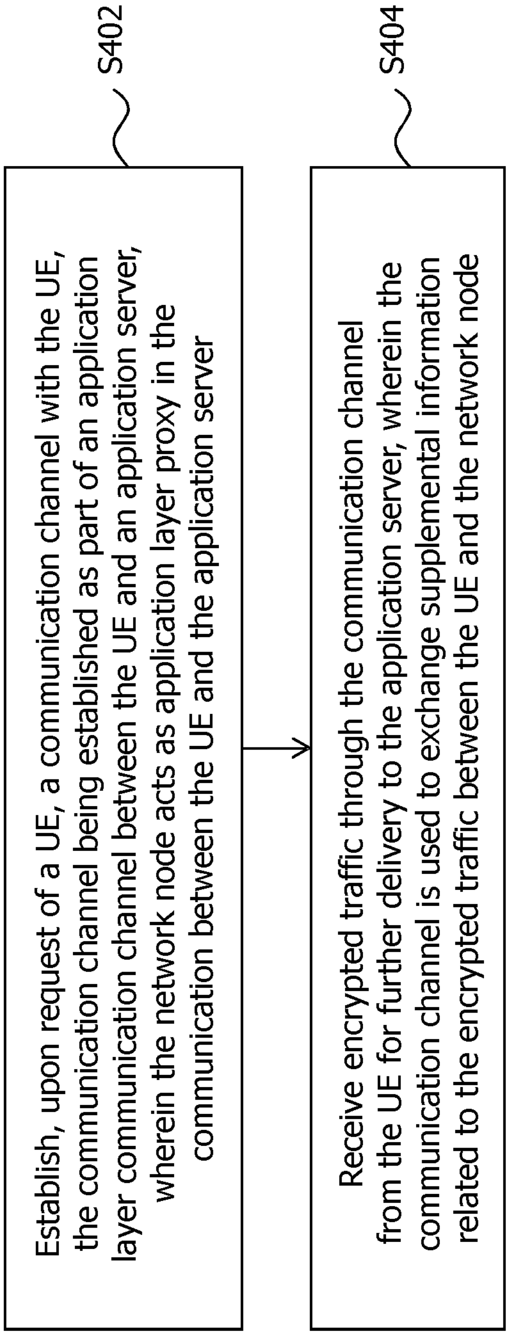
FIG. 4 illustrates a method which may be performed by the network node according to the present disclosure.

FIG. 4 illustrates a method which may be performed by the network node executed on the computing unit 210. The method is dedicated to enabling exposure of information related to encrypted communication between a UE (e.g., the UE 200) and an application server in a mobile communication system. The method of FIG. 4 may define a method from the perspective of the network node described above in relation to FIG. 3 and, as such, aspects of the UE and the network node described above may be applicable to the UE and the network node described in the following as well, and vice versa. Unnecessary repetitions are thus omitted in the following.

In step S402, the network node may establish, upon request of the UE, a communication channel with the UE, the communication channel being established as part of an application layer communication channel between the UE and the application server, wherein the network node acts as application layer proxy in the communication between the UE and the application server. In step S404, the network node may receive encrypted traffic through the communication channel from the UE for further delivery to the application server, wherein the communication channel is used to exchange supplemental information related to the encrypted traffic between the UE and the network node.

As described above in relation to FIG. 3, the supplemental information may comprise an application identifier communicated from the UE to the network node, wherein the application identifier indicates an application which originates the encrypted traffic on the UE. The application identifier may be used by the network node to classify the encrypted traffic, optionally for an enforcement of policy rules defined for the communication between the UE and the application server. The encrypted traffic may be communicated as part of one of a plurality of application sessions, wherein encrypted traffic of each of the plurality of application sessions may be sent through the communication channel, wherein the encrypted traffic of each of the plurality of application sessions may be sent over a same data session established by the mobile communication system for the UE. The encrypted traffic may correspond to QUIC protocol based traffic exchanged between the UE and the application server. The supplemental information may comprise information indicating one or more QUIC connections which are associated with the application identifier. The application identifier may be communicated from the UE to the network node together with the encrypted traffic, wherein the application identifier may be removed by the network node prior to delivery of the encrypted traffic to the application server. The communication channel may be at least one of an encrypted communication channel and an authenticated communication channel.

As said, discovery mechanisms may be employed to inform the UE about the network address to be used to reach the network node acting as application layer proxy. In order to support such discovery mechanisms, a network node capable of acting as application layer proxy may communicate such capability to a control plane node of the mobile communication system responsible for selecting network nodes acting as application layer proxy for the communication between the UE and the application server (such control plane node is hereinafter denoted as the "first control plane node"). The method performed by the UE may thus further comprise sending, prior to establishing the communication channel, a capability indication to a first control plane node of the mobile communication system for use in selecting a network node acting as application layer proxy for the communication between the UE and the application server, the capability indication indicating that the network node supports acting as application layer proxy. As an example, if the network node acting as application layer proxy is a gateway node of the mobile communication system, such as a UPF of a 5G network or a PGW-U or TDF-U of a 4G network, for example, the gateway node may inform the first control plane node, such as an SMF of a 5G network or a PDN Gateway Control function (PGW-C) or Traffic Detection Function Control plane function (TDF-C) of a 4G network, for example, of the gateway node's capability of acting as application layer proxy. The first control plane node may then consider this information in selecting a gateway node for the communication between the UE and the application server. Upon making a selection, the first control plane node may instruct the selected network node to act as application layer proxy accordingly. The method performed by the network node may thus further comprise receiving, prior to establishing the communication channel, an instruction to act as application layer proxy from the first control plane node of the mobile communication system, and activate acting as application layer proxy in accordance with the instruction.

Similar to the capability indication, the network node may also inform the first control plane node of the network address at which the network node acting as application layer proxy can be reached. The method performed by the network node may thus further comprise providing, prior to establishing the communication channel, a network address indicative of the network node acting as application layer proxy to a control plane node of the mobile communication network. At least one of sending the capability indication, receiving the instruction to act as application layer proxy and providing the network address may be performed as part of a data session establishment procedure carried out in the mobile communication system for the UE, such as as part of the PDU session establishment procedure carried out for the UE in a 5G network, for example.

Figure 5:
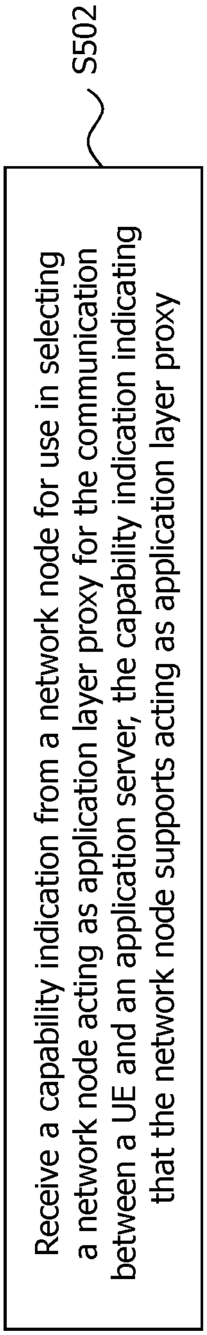
FIG. 5 illustrates a method which may be performed by the first control plane node according to the present disclosure.

FIG. 5 illustrates a method which may be performed by the first control plane unit executed on the computing unit 220. The method is dedicated to enabling exposure of information related to encrypted communication between a UE (e.g., the UE 200) and an application server in a mobile communication system. The mobile communication system comprises a network node (e.g., the network node executed on the computing unit 210) configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node. The method of FIG. 5 may define a method from the perspective of the first control plane node described above in relation to FIGS. 3 and 4 and, as such, aspects of the UE, the network node and the first control plane node described above may be applicable to the UE, the network node and the first control plane node described in the following as well, and vice versa. Unnecessary repetitions are thus omitted in the following.

In step S502, the first control plane node may receive a capability indication from the network node for use in selecting a network node acting as application layer proxy for the communication between the UE and the application server, the capability indication indicating that the network node supports acting as application layer proxy.

As said, the first control plane node may be a control plane node responsible for network node (acting as application layer proxy) selection. While it will be understood that the first control plane node may make a decision on the selection on its own, in other variants, the decision on the selection may be dictated by another control plane node of the mobile communication system, such as a control plane node responsible for policy control (such control plane node is hereinafter denoted as the "second control plane node"). The second control plane node may be a PCF of a 5G network or a Policy Control Rules Function (PCRF) of a 4G network, for example. The method performed by the first control plane node may thus further comprise receiving, optionally from the second control plane node, an indication of a requirement that a network node handling the communication between the UE and the application server is to support acting as application layer proxy, selecting the network node for the communication between the UE and the application server based on the capability indication, and instructing the network node to act as application layer proxy, as described above. Likewise, the method performed by the first control plane node may further comprise receiving, from the network node, a network address indicative of the network node acting as application layer proxy, and providing the network address to the UE, optionally via one or more other control plane nodes of the mobile communication system, so as to inform the UE at which the network address the network node acting as application layer proxy can be reached, as described above. At least one of receiving the indication of the requirement and providing the network address may be performed as part of a data session establishment procedure carried out in the mobile communication system for the UE, such as as part of the PDU session establishment procedure carried out for the UE in a 5G network, for example.

Figure 6:
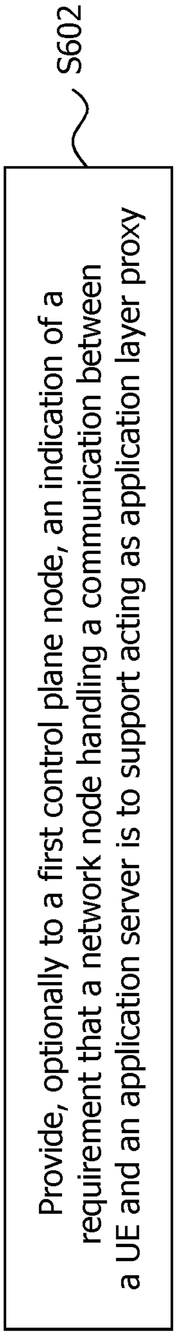
FIG. 6 illustrates a method which may be performed by the second control plane node according to the present disclosure.

FIG. 6 illustrates a method which may be performed by the second control plane node executed on the computing unit 230. The method is dedicated to enabling exposure of information related to encrypted communication between a UE (e.g., the UE 200) and an application server in a mobile communication system. The mobile communication system comprises a network node (e.g., the network node executed on the computing unit 210) configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node. The method of FIG. 6 may define a method from the perspective of the second control plane function described above in relation to FIGS. 3 to 5 and, as such, aspects of the UE, the network node, the first control plane function and the second control plane function described above may be applicable to the UE, the network node for the first control plane function and second control plane function described in the following as well, and vice versa. Unnecessary repetitions are thus omitted in the following.

In step S602, the second control plane function may provide, optionally to a first control plane node (e.g., the first control plane function executed on the computing unit 220), an indication of a requirement that a network node handling the communication between the UE and the application server is to support acting as application layer proxy.

As said, the second control plane node may be a control plane node responsible for policy control and the indication of the requirement may be provided to the first control plane node in the form of a policy rule. While it will be understood that the second control plane node may establish the requirement on its own, in other variants, the requirement may be obtained from a data repository of the mobile communication system, such as a UDR of a 5G network, for example, wherein the requirement may be obtained from the data repository in the form of subscriber policy data. The requirement may be originally set by the application server and communicated to the mobile communication system via an exposure interface of the mobile communication system. In a 5G network, for example, a content provider providing the application server may communicate the requirement via the existing exposure mechanism through the Nnef interface, wherein the requirement may be stored in as subscriber data in the data repository for later use.

Once the subscriber policy data is received from the data repository, the second control plane node may provide the indication of the requirement to the first control plane node in the form of a policy rule, as described above (e.g., in the form of a PCC rule). When the first control plane node then instructs the network node to act as application layer proxy, the first control plane node may convey corresponding enforcement rules to the network node, e.g., defining how certain information of the encrypted traffic is to be exposed. These rules may be provided in the form of Packet Detection Rules (PDRs), Forwarding Action Rules (FARs), QoS Enhancement Rules (QERs) and/or Usage Reporting Rules (URRs) to be enforced (e.g., by the network node), for example.

Figure 7A:
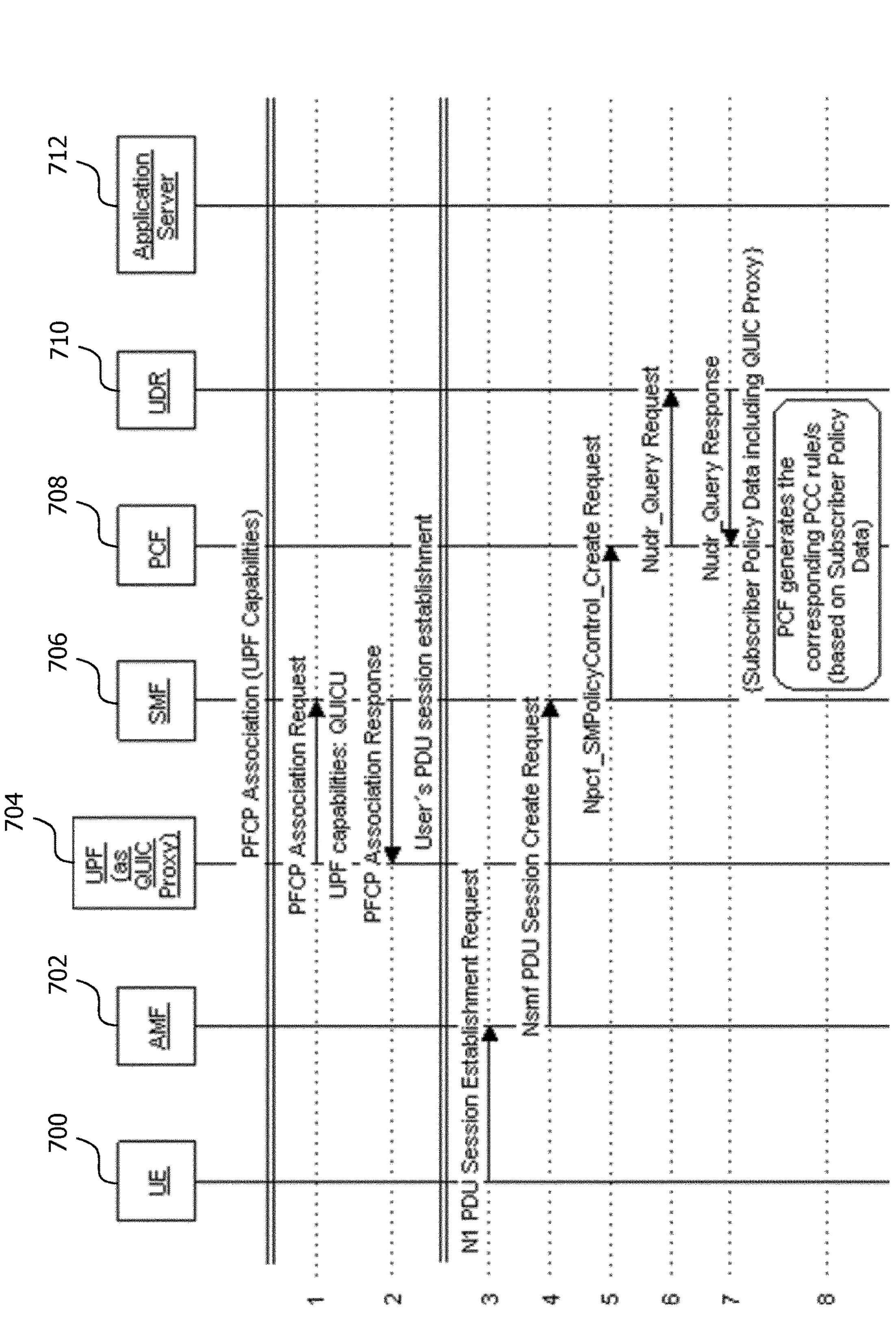
Figure 7B:
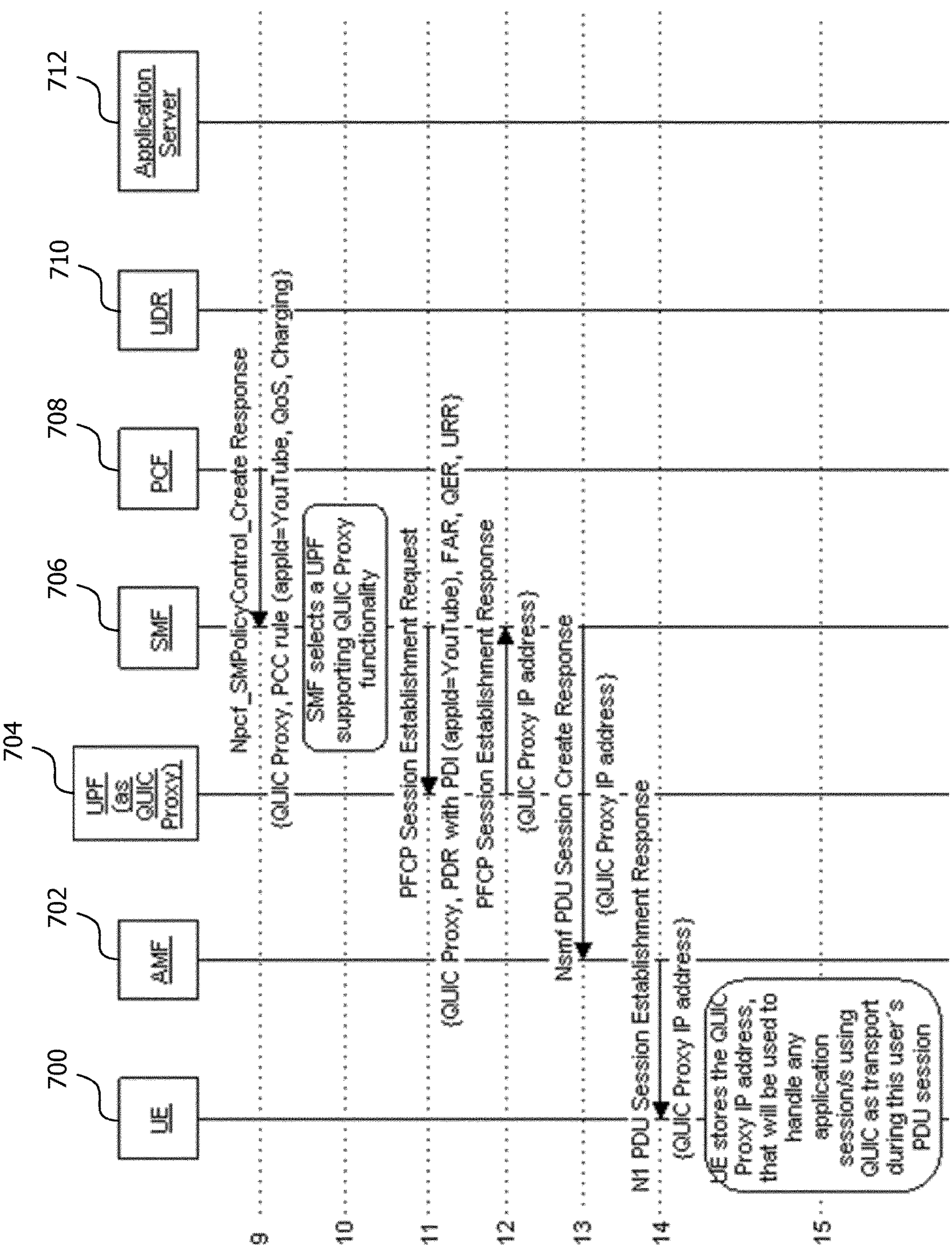
Figure 7C:
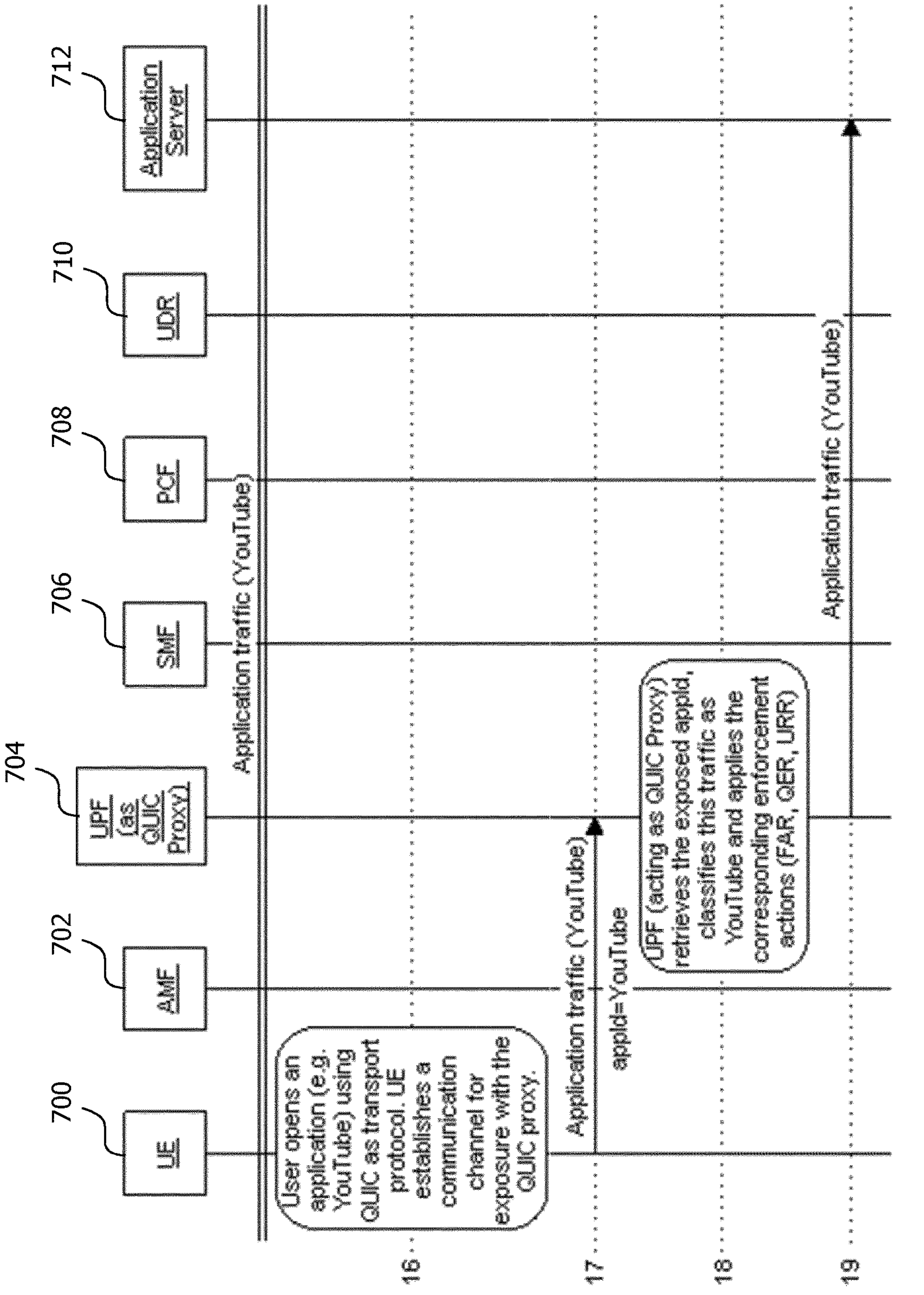

In the following, reference will be made to FIGS. 7 to 10 which exemplify the technique presented herein in a more illustrative manner. Among these figures, FIGS. 7*a* to 7*c* illustrate a signaling diagram of an exemplary interaction between entities of a mobile communication system according to the present disclosure and FIGS. 8 to 10 illustrate exemplary protocol extensions that may be used to implement the exemplary interaction. The shown example relates to a use case performed in a 5G network comprising a UE 700, an AMF 702, a UPF 704, an SMF 706, a PCF 708, a UDR of 710 and an application server 712. It will be understood that an equivalent interaction may also be performed in other types of mobile communication networks, such as in a 4G network, for example. In the example use case, the QUIC protocol is employed for the transmission of application layer traffic and the UPF 704 thus generally acts as a QUIC proxy. It will be understood that such scenario is merely exemplary and that the employment of other transport protocols or other proxy nodes in the mobile communication system may generally be conceivable. Likewise, while the application layer traffic in the example use case generally corresponds to YouTube traffic, it will be understood that any other kind of application layer traffic may be used, such as any kind of HTTP/3 or MASQUE based traffic, for example.

In steps 1 and 2 of the procedure, a Packet Forwarding Control Protocol (PFCP) Association procedure may be performed, in which the existing mechanism to report UPF capabilities between the UPF 704 and the SMF 706 may be extended for reports of a new capability indication allowing the SMF 706 to know which UPFs support this capability and thus influencing UPF selection. FIG. 8 illustrates an exemplary protocol extension to an existing UPF capabilities reporting where support of acting as QUIC proxy by the UPF is indicated as new feature "QUICU" in bold font at the end of the table.

After that, the UE 700 may trigger PDU session establishment. In step 3, the UE 700 may send a PDU Session Establishment Request to the AMF 702 which, in turn, may select the SMF 706 to manage the UE's PDU session and may trigger the Nsmf_PDU_Session_Create_Request message in step 4 accordingly (note: this only represents a simplified signaling sequence in the PDU Session Establishment procedure, wherein unnecessary details are omitted). In step 5, the SMF 706 may trigger the Npcf_SMPolicyControl_CreateRequest message to retrieve session management policies for the UE's PDU session from the PCF 708. In steps 6 and 7, the PCF 708 may then obtain the requested policy data, which the PCF 708 may do by retrieving the policy data from the UDR 710 using an Nudr_Query_Request, wherein the corresponding Nudr_Query_Response may include the requested Subscriber Policy Data. This data may indicate the requirement to use QUIC proxy functionality for this PDU session (e.g., indicated by a corresponding flag). The PCF 708 may then generate, in step 8, a Policy and Charging Control (PCC) rule—in the presented example a PCC rule for QUIC video applications—based on the Subscriber Policy Data and may pass, in step 9, the generated PCC rule together with the QUIC proxy requirement indication to the SMF 706 using an Npcf_SMPolicyControl_CreateResponse message. The generated PCC rule may indicate a corresponding appId=YouTube (e.g., as obtained from the Subscriber Policy Data) as well as required enforcement actions for QoS and Charging, for example.

The SMF 706 may then select, in step 10, the UPF 704 as a gateway node supporting the QUIC proxy functionality. In step 11, the SMF 706 may trigger a PFCP_Session_Establishment_Request message including PDR, FAR, QER and/or URR rules to be enforced by the UPF (in the shown example, a PDR with a Packet Detection Information (PDI) of type application with appId=YouTube is defined) as well as a new QUIC proxy Information Element (IE) which instructs the UPF 704 to act as QUIC proxy for this PDU session. FIGS. 9*a* and 9*b* illustrate an exemplary extension of the PFCP protocol where QUIC proxy instructions to be applied by the UPF are indicated in the form of a new attribute in bold font at the end of the table. In step 12, the UPF 704 may then store the received PDRs/FARs/URRs/QERs and respond with a PFCP_Session_Establishment_Response message to the SMF 706. At this point, the UPF 704 may activate the QUIC proxy functionality for this session and, in case of success, the UPF 704 may include the IP address of the UPF 704 acting as QUIC proxy in the PFCP_Session_Establishment_Response message to inform the SMF 706 about the network address at which the QUIC proxy can be reached. FIG. 10 illustrates an exemplary extension of the PFCP protocol where corresponding information is again indicated in the form of a new attribute in bold font at the end of the table.

In step 13, the SMF 706 may respond to the Nsmf_PDU_Session_Create_Request message of step 4 by sending an Nsmf_PDU_Session_Create_Response message to the AMF 702 which, in turn, may answer the PDU Session Establishment Request of step 3 by sending a PDU Session Establishment Response to the UE 700. In both messages, the QUIC proxy IP address may be included to finally inform the UE 200 at which network address the UPF 704 acting as QUIC proxy can be reached.

In step 15, the UE 700 may store the QUIC proxy IP address, which may be used to handle any application session using QUIC as transport protocol during this UE's PDU session. In step 16, the user of the UE 700 may then open an application, such as the YouTube client app (i.e., an application employing QUIC), and the UE 700 (more specifically, the client app) may establish a communication channel with the UPF 704 acting as QUIC proxy to be used for exposure. Since QUIC proxy functionality is activated for this UE's PDU session and the application uses the QUIC transport protocol, the client application (YouTube) may thus set up an encrypted and authenticated communication channel for exposure between the client application and the QUIC proxy (identified by the QUIC proxy IP address discovered in the previous steps). In step 17, application traffic may then be started and YouTube traffic may thus pass through the UPF 704 acting as QUIC proxy. In the shown example, an application identifier indicating that YouTube is the application that originates the encrypted traffic may be sent along with the encrypted traffic (e.g., appId=YouTube). As an endpoint of the communication channel, the QUIC proxy may have access to the clear text of the encrypted traffic and may thus expose the application identifier, as described above. Additional information about which QUIC connections the application identifier is associated with may be exposed as well. Using this information, accurate classification and mapping of the correct application policy in the network may be enabled, even when the actual application traffic is encrypted and, also, when IP address information is to coarse or volatile such that problems with Network Address Translations (NATs) may occur, for example. In step 18, the UPF 704 acting as QUIC proxy may thus retrieve the application identifier, classify the traffic as YouTube traffic, and apply corresponding enforcement actions (e.g., FAR, QER, URR) accordingly. At this point, the UPF 704 may also remove the exposed application identifier (appId) from the traffic, so that the traffic going towards the application server 712 in step 19 may no longer include the application identifier because, on the further way to the application server 712, the application identifier may no longer be needed.

It will be understood that the above procedure may be subject to certain preconditions. For example, the application identifier (e.g., appId=YouTube) and the corresponding policies (QoS, Charging, etc.) may be pre-provisioned at the UDR 710 on a per subscriber basis as part of a subscriber policy profile, for example. Alternatively, this information could also be pre-provisioned for any subscriber on a global basis, for example. A policy to enable exposure through the QUIC proxy may likewise be pre-provisioned at the UDR 710 on a per subscriber basis as part of the subscriber policy profile, or may be pre-provisioned for any subscriber on a global basis. While, in the sequence diagram of FIGS. 7*a* to 7*c*, a discovery mechanism for the QUIC proxy is performed as part of a PDU session establishment procedure, it will be understood that alternative mechanisms for discovery may be employed, such as DNS based discovery using a QUIC proxy FQDN pre-provisioned (e.g., at UE application layer) as part of an SLA agreement between the network operator and the content provider, for example. In still another alternative, it may be conceivable that the policies are not pre-provisioned as part of an SLA, but instead are dynamically conveyed from the content provider to the network operator via the Nnef northbound interface, such as using an Nnef API for setting up an application server session with required QoS or using an Nnef API for changing the chargeable party at session set up or during the session. As described above, it may further be conceivable to extend the existing Nnef northbound interface for content providers to indicate to network operators the need of exposure through the QUIC proxy (e.g., on a per application basis).

As has become apparent from the above, the present disclosure provides a technique for enabling exposure of information related to encrypted communication between a UE and an application server in a mobile communication system. The exposure mechanism through the application layer proxy may be implemented at application level, wherein the application client and/or the application server may exchange exposure information with the network operator via the application layer proxy. The proposed technique may in particular enable network operators and content providers to support an exposure mechanism in the context of networks supporting the CUPS architecture, even when application traffic is encrypted. The proposed technique may involve protocol extensions at different interfaces of the network, such as at the N1, N4, Nsmf, Npcf and Nudr interfaces of the network (cf. FIG. 1), as exemplarily illustrated by the protocol extensions of FIGS. 8 to 10. By means of an encrypted and authenticated communication channel between a client (and/or a server) application and the proxy, the technique may be used to communicate application identifiers and information about which (e.g., QUIC) connections the application identifier is associated with, and may therefore not only allow 100% accurate mapping between an application session and its corresponding IP flows, but also allow 100% accurate classification and mapping to the correct application policy to be enforced in the CN of the mobile communication system, even when traffic is encrypted and IP address information is to coarse and volatile (e.g., such that no problems with NATs or Content Delivery Networks (CDNs) may occur). In contrast to using publicly visible information such as SNI or specific IP ranges associated with specific applications, the exposed information may only be available to explicitly configured network entities hidden from the rest of the path, thereby also ensuring end user privacy. The presented technique may generally be extensible, i.e., the communication channel between the proxy and the client can be extended with new standard or proprietary procedures, so that existing and future (e.g., 3GPP) exposure interfaces can be mapped on top of the communication channel, for example. Also, the user may always have the possibility to opt out of any service provided by the proxy, or completely opt out of using the proxy if it is not considered beneficial.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for enabling exposure of information related to encrypted communication between a User Equipment (UE) and an application server in a mobile communication system, the method being performed by the UE and comprising:

establishing a communication channel with a network node of the mobile communication system, the communication channel being established as part of an application layer communication channel between the UE and the application server, wherein the network node acts as application layer proxy in communication between the UE and the application server; and sending encrypted traffic through the communication channel to the network node for further delivery to the application server, wherein the communication channel is used to exchange supplemental information related to the encrypted traffic between the UE and the network node, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

2. The method of claim 1, wherein the supplemental information comprises the application identifier communicated from the UE to the network node.

3. The method of claim 1, wherein the encrypted traffic is communicated as part of one of a plurality of application sessions, wherein encrypted traffic of each of the plurality of application sessions is sent through the communication channel, wherein the encrypted traffic of each of the plurality of application sessions is sent over a same data session established by the mobile communication system for the UE.

4. The method of claim 2, wherein the application identifier is communicated from the UE to the network node together with the encrypted traffic.

5. The method of claim 1, further comprising receiving a network address indicative of the network node acting as application layer proxy, wherein establishing the communication channel with the network node is performed using the network address.

6. The method of claim 5, wherein the network address is provided by a control plane node of the mobile communication system, as part of a data session establishment procedure carried out in the mobile communication system for the UE.

7. The method of claim 5 wherein the network address is obtained from a Domain Name System (DNS) service, wherein a Fully Qualified Domain Name (FQDN) of the network node acting as application layer proxy is preprovisioned as part of a Service Level Agreement (SLA).

8. A method for enabling exposure of information related to encrypted communication between a User Equipment (UE) and an application server in a mobile communication system, the method being performed by a network node of the mobile communication system and comprising:

establishing, upon request of the UE, a communication channel with the UE, the communication channel being established as part of an application layer communication channel between the UE and the application server, wherein the network node acts as application layer proxy in communication between the UE and the application server; and receiving encrypted traffic through the communication channel from the UE for further delivery to the application server, wherein the communication channel is used to exchange supplemental information related to the encrypted traffic between the UE and the network node, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

9. The method of claim 8, wherein the supplemental information comprises the application identifier communicated from the UE to the network node.

10. The method of claim 9, further comprising using the application identifier to classify the encrypted traffic, for an enforcement of policy rules defined for the communication between the UE and the application server.

11. The method of claim 8, wherein the encrypted traffic is communicated as part of one of a plurality of application sessions, wherein encrypted traffic of each of the plurality of application sessions is sent through the communication channel, wherein the encrypted traffic of each of the plurality of application sessions is sent over a same data session established by the mobile communication system for the UE.

12. A method for enabling exposure of information related to encrypted communication between a User Equipment (UE) and an application server in a mobile communication system, the mobile communication system comprising a network node configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node, the method being performed by a first control plane node of the mobile communication system and comprising:

receiving a capability indication from the network node for use in selecting a network node acting as application layer proxy for the communication between the UE and the application server, the capability indication indicating that the network node supports acting as application layer proxy, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

13. A method for enabling exposure of information related to encrypted communication between a User Equipment (UE) and an application server in a mobile communication system, the mobile communication system comprising a network node configured to act as application layer proxy in the communication between the UE and the application server when a communication channel is established as part of an application layer communication channel between the UE and the application server, the communication channel being used to communicate encrypted traffic from the UE to the network node for further delivery to the application server, and the communication channel being used to exchange supplemental information related to the encrypted traffic between the UE and the network node, the method being performed by a second control plane node of the mobile communication system and comprising:

providing, to a first control plane node, an indication of a requirement that a network node handling the communication between the UE and the application server is to support acting as application layer proxy, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

14. A User Equipment (UE) for enabling exposure of information related to encrypted communication between the UE and an application server in a mobile communication system, the UE comprising:

at least one processor; and at least one memory, the at least one memory containing instructions executable by the at least one processor such that the UE is operable to:

establish a communication channel with a network node of the mobile communication system, the communication channel being established as part of an application layer communication channel between the UE and the application server, wherein the network node acts as application layer proxy in communication between the UE and the application server; and send encrypted traffic through the communication channel to the network node for further delivery to the application server, wherein the communication channel is used to exchange supplemental information related to the encrypted traffic between the UE and the network node, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

15. The UE of claim 14, wherein the supplemental information comprises the application identifier communicated from the UE to the network node.

16. The UE of claim 14, wherein the encrypted traffic is communicated as part of one of a plurality of application sessions, wherein encrypted traffic of each of the plurality of application sessions is sent through the communication channel, wherein the encrypted traffic of each of the plurality of application sessions is sent over a same data session established by the mobile communication system for the UE.

17. The UE of claim 15, wherein the application identifier is communicated from the UE to the network node together with the encrypted traffic.

18. The UE of claim 14, the at least one memory containing instructions executable by the at least one processor such that the UE is operable to receive a network address indicative of the network node acting as application layer proxy, and to establish the communication channel with the network node using the network address.

19. The UE of claim 18, wherein the network address is provided by a control plane node of the mobile communication system, as part of a data session establishment procedure carried out in the mobile communication system for the UE.

20. The UE of claim 18, wherein the network address is obtained from a Domain Name System (DNS) service, wherein a Fully Qualified Domain Name (FQDN) of the network node acting as application layer proxy is pre-provisioned as part of a Service Level Agreement (SLA).

21. A computing unit configured to execute a network node of a mobile communication system for enabling exposure of information related to encrypted communication between a User Equipment (UE) and an application server in the mobile communication system, the computing unit comprising:

at least one processor; and at least one memory, the at least one memory containing instructions executable by the at least one processor such that the network node is operable to:

establish, upon request of the UE, a communication channel with the UE, the communication channel being established as part of an application layer communication channel between the UE and the application server, wherein the network node acts as application layer proxy in communication between the UE and the application server; and receive encrypted traffic through the communication channel from the UE for further delivery to the application server, wherein the communication channel is used to exchange supplemental information related to the encrypted traffic between the UE and the network node, wherein the encrypted traffic corresponds to QUIC protocol based traffic exchanged between the UE and the application server, wherein the supplemental information comprises information indicating one or more QUIC connections which are associated with an application identifier indicating an application which originates the encrypted traffic on the UE.

22. The computing unit of claim 21, wherein the supplemental information comprises the application identifier communicated from the UE to the network node.

23. The computing unit of claim 22, the at least one memory containing instructions executable by the at least one processor such that the network node is operable to use the application identifier to classify the encrypted traffic, for an enforcement of policy rules defined for the communication between the UE and the application server.

24. The computing unit of claim 21, wherein the encrypted traffic is communicated as part of one of a plurality of application sessions, wherein encrypted traffic of each of the plurality of application sessions is sent through the communication channel, wherein the encrypted traffic of each of the plurality of application sessions is sent over a same data session established by the mobile communication system for the UE.

25. The computing unit of claim 21, the at least one memory containing instructions executable by the at least one processor such that the network node is operable to:

send, prior to establishing the communication channel, a capability indication to a control plane node of the mobile communication system for use in selecting a network node acting as application layer proxy for the communication between the UE and the application server, the capability indication indicating that the network node supports acting as application layer proxy; or provide, prior to establishing the communication channel, a network address indicative of the network node acting as application layer proxy to a control plane node of the mobile communication network.

26. The method of claim 1, wherein the application layer communication channel is between an application client running on the UE and the application server at an application layer of a communication protocol stack, wherein the communication channel is established, as a first part of the application layer communication channel, between the application client and the network node at the application layer, wherein a second part of the application layer communication channel is established between the network node and the application server at the application layer, and wherein the method further comprises using the communication channel to exchange the supplemental information between the application client and the network node at the application layer.

27. The method of claim 8, wherein the application layer communication channel is between an application client running on the UE and the application server at an application layer of a communication protocol stack, wherein the communication channel is established, as a first part of the application layer communication channel, between the application client and the network node at the application layer, wherein a second part of the application layer communication channel is established between the network node and the application server at the application layer, and wherein the method further comprises using the communication channel to exchange the supplemental information between the application client and the network node at the application layer.

28. The UE of claim 14, wherein the application layer communication channel is between an application client running on the UE and the application server at an application layer of a communication protocol stack, wherein the communication channel is established, as a first part of the application layer communication channel, between the application client and the network node at the application layer, wherein a second part of the application layer communication channel is established between the network node and the application server at the application layer, and wherein the at least one memory contains instructions executable by the at least one processor such that the UE is further operable to use the communication channel to exchange the supplemental information between the application client and the network node at the application layer.

29. The computing unit of claim 21, wherein the application layer communication channel is between an application client running on the UE and the application server at an application layer of a communication protocol stack, wherein the communication channel is established, as a first part of the application layer communication channel, between the application client and the network node at the application layer, wherein a second part of the application layer communication channel is established between the network node and the application server at the application layer, and wherein the at least one memory contains instructions executable by the at least one processor such that the network node is further operable to use the communication channel to exchange the supplemental information between the application client and the network node at the application layer.

* * * * *